Dec. 13, 1927.

W. W. HICKS 1,652,438

CONVECTION HEATER

Original Filed Nov. 14, 1924

INVENTOR.
William Wesley Hicks
BY White Frost
his ATTORNEYS

Patented Dec. 13, 1927.

1,652,438

UNITED STATES PATENT OFFICE.

WILLIAM WESLEY HICKS, OF SAN FRANCISCO, CALIFORNIA.

CONVECTION HEATER.

Original application filed November 14, 1924, Serial No. 749,866. Divided and this application filed January 26, 1926. Serial No. 83,802.

This application is a division of the applicant's copending case No. 749,866, filed Nov. 14, 1924, entitled "Convection heater" and relates generally to an improvement in electrical air heaters such as are commonly employed in heating the rooms of a building. Such a heater is disclosed in my Patent No. 1,518,067, issued Dec. 2, 1924, and entitled "Electric heater".

In heaters of the above type it is common practice to employ electrical heating elements which are operated at relatively high temperature so as to radiate a large amount of heat. If such a heater is provided with an open front grill for the free passage of convection currents of air a restricted space in front of the heater will be directly exposed to this radiant heat. In many instances this is objectionable; for example, it may create a serious fire hazard or where the occupants must remain in one position those within the restricted area experience an unpleasantly high degree of heat.

It is an object of this invention to provide an electrical air heater with means for intercepting radiant heat which is radiated from the heating elements in a given general direction.

It is a further object of this invention to provide an electrical heater of the open front housing type with a grill in which the air passages are arranged at an angle to the general direction from which it is desired to intercept radiant heat.

It is a further object of this invention to construct a grill for an electrical air heater with a louver bar arrangement to intercept radiant heat from the heating elements.

It is a further object of this invention to construct a grill for an electrical air heater with a louver bar arrangement to intercept radiant heat from the heating elements, the bars in the lower portion being arranged to form downwardly inclined passages and those in the upper portion being arranged to form upwardly inclined passageways.

It is another object of this invention to construct a grill for an electrical air heater with a louver bar arrangement and to provide an auxiliary baffle on the grill to maintain the louver bars relatively cool.

Further objects of the invention will appear in the following description in which the preferred embodiment of the invention has been set forth in detail.

Referring to the drawings.

Figure 1:
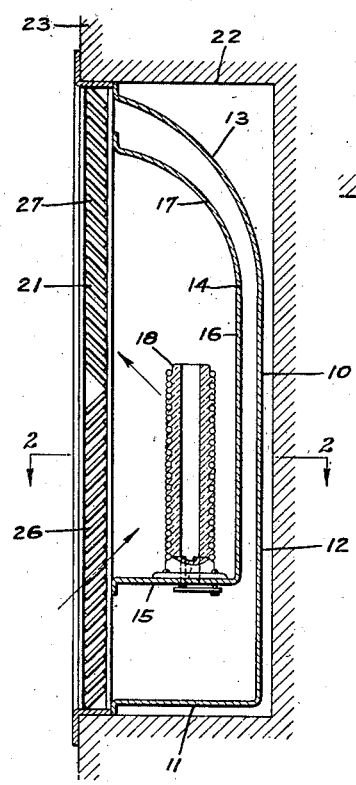
Figure 1 is a transverse cross sectional view showing an electrical air heater embodying the improvement of this invention.
Figure 2:
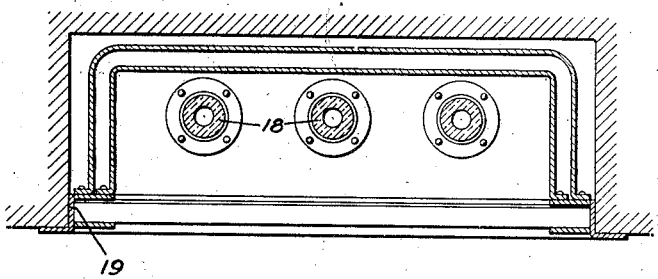
Fig. 2 is a cross section taken along the line 2—2 of Fig. 1.

The device has been illustrated in the drawings as being applied to a wall type of electrical air heater. However, it is obvious that the novel features as defined by the appended claims may be applied to any form of electrical heater which employs a source of radiant heat. The heater shown comprises generally a housing 10 having a bottom wall 11, back wall 12 and an upper forwardly curved wall 13. Within this housing there is arranged a shell 14 which is correspondingly provided with a bottom wall 15, back wall 16 and an upper forwardly curved wall 17. A plurality of electrical heating elements 18 are disposed within the shell 14, being preferably supported upon the bottom wall 15. The front edges of the housing 10 and the shell 14 are secured to a common frame 19 as shown in Fig. 2 so that the shell is supported in spaced relationship to the housing. The front portion of the heater is inclosed by a grill 21 which is adapted to allow convection currents of air to pass into the lower portion of the casing, upward between the shell and the housing, and out of the upper portion of the housing. As shown in the drawings, the heater may be set into an opening 22 in a wall 23.

With the arrangement above described it will be obvious that the heating elements 18 will tend to radiate a large amount of heat thru the front grill 21, that is in the general direction forward of the heater. To intercept this radiant heat the grill is constructed with a plurality of spaced bars 26 and 27 which are inclined to form a louver like arrangement. This construction provides a grill with a plurality of passageways which are inclined toward the general direction from which it is desired to intercept radiant heat. Therefore, the heat radiated forwardly of the heating elements 18 will be partially reflected backward and partially absorbed by the exposed surfaces of the bars 26 and 27. The bars 26 are preferably inclined downwardly and the bars 27 inclined upwardly in order to facilitate passage of convection currents of air into and out of the housing and shell. Thus the heat which normally would be radiated directly forward of the heater is taken up by convection currents of air. As the bars 26 and 27 are of substantial width as shown, the heat absorbed by the same may be effectively imparted to convection currents of air to maintain the outer face of the baffle relatively cool.

Figure 3:
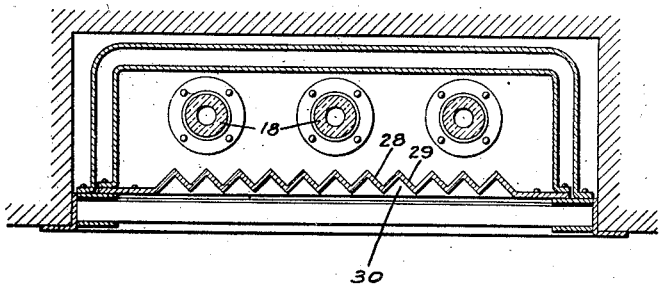
Fig. 3 is a view similar to Fig. 2 showing a modified construction.

In the modification shown in Fig. 3 the intermediate portion of the grill 21 directly in front of the heating elements 18 is provided with an auxiliary baffle 28 which extends across the front of the shell 14. This baffle is preferably constructed in the form of a corrugated plate 29 secured adjacent the inner face of the grill 21 and extending from the level of the bottom of the heating elements to a point adjacent the upper ends thereof. Thus the baffle plate in conjunction with the grill 21 provides a series of contiguous open ended flues 30 for the passage of convection currents of air. A certain amount of the radiant heat striking the inner surfaces of the plate 29 is reflected by means of the housing 10 while the remainder is absorbed and taken up by convection currents of air passing through the passageways 30. By means of this construction the bars 26 and 27 of the grill are maintained relatively cool where the radiant heat intercepted is most intense.

I claim:

1. In an electric heater, a heating element, means forming a chamber in which the element is supported, a series of slanting bars forming a louver-like arrangement in front of the chamber, to permit air to circulate past the element, and an auxiliary baffle disposed between the bars and the element, and forming a vertical air passageway between it and the bars.

2. In an electric heater, a heating element, means forming a chamber in which the element is supported, a series of slanting bars forming a louver-like arrangement in front of the chamber, to permit air to circulate past the element, the upper portion of the bars slanting outwardly in an upward direction, and the lower portion slanting outwardly in a downward direction, and an auxiliary baffle disposed between the bars and the element, and forming a vertical air passageway between it and the bars.

3. An air heater comprising a housing having an open front, heating means within said housing, and a grill extending over said open front spaced from said heating means, said grill being formed with a plurality of downwardly inclined passageways in its lower portion and a plurality of upwardly inclined passageways in its upper portion whereby convection currents of air may freely pass into the lower and out of the upper portion of the grill but heat radiated from said heating means will be intercepted.

4. An electrical air heater comprising a housing having an open side, radiant heating means within said housing, a grill extending over said open side, said grill including a plurality of spaced inclined bars, and an auxiliary baffle interposed between said grill and said heating means.

5. An electrical air heater comprising a housing having an open side, radiant heating means within said housing, a grill extending over said open side, said grill including a plurality of spaced inclined bars, and an auxiliary baffle interposed between said grill and said heating means, said baffle forming a series of open ended flues.

6. In an electric air heater, an electrical heating element adapted to radiate a substantial amount of heat, a housing enclosing said element and having an open side, and a baffle secured to said housing and serving to intercept heat tending to radiate thru said side, said baffle comprising a plurality of spaced inclined louver bars whereby convection currents of air may pass into and out of the housing between said bars, said bars being of substantial width whereby the outer face of the baffle is maintained at a relatively cool safe temperature.

In testimony whereof, I have hereunto set my hand.

WILLIAM WESLEY HICKS.